Figures 1, 2, 3:
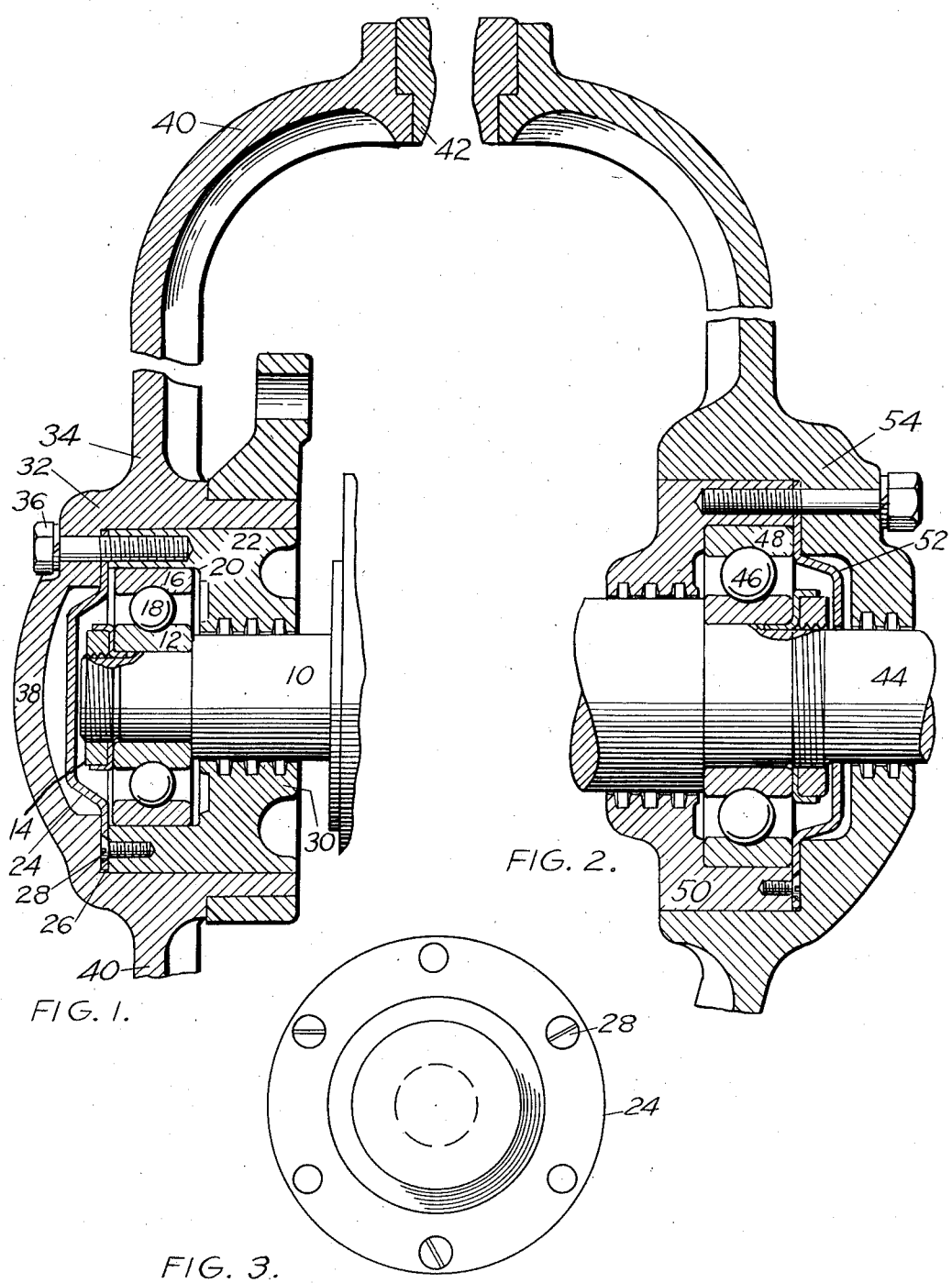

Oct. 30, 1928.

R. L. BROWN 1,689,856

BEARING MOUNTING

Filed July 2, 1925

INVENTOR:
RAYMOND L. BROWN,
BY
HIS ATTORNEY.

Patented Oct. 30, 1928.

1,689,856

UNITED STATES PATENT OFFICE.

RAYMOND L. BROWN, OF BRISTOL, CONNECTICUT, ASSIGNOR TO THE NEW DEPARTURE MANUFACTURING COMPANY, OF BRISTOL, CONNECTICUT, A CORPORATION OF CONNECTICUT.

BEARING MOUNTING.

Application filed July 2, 1925. Serial No. 41,038.

This invention relates to bearing mountings and comprises all the features of novelty herein disclosed, by way of example, as embodied in a ball bearing mounting for an armature shaft.

An object of the invention is to provide an improved ball bearing mounting which will keep the bearings protected and undisturbed on the shaft when the ends of the casing and the shaft are disassembled. Another object is to provide a cheap and efficient housing for antifriction bearings and one which can be easily assembled with the bearings and the casing.

To these ends and also to improve generally upon devices of the character indicated my invention consists in the various matters hereinafter described and claimed.

In the drawings, Figure 1 is a central longitudinal section of the commutator end of a motor casing and Figure 2 is a similar section of the opposite end.

Figure 3 is an end view of one of the bearing housings.

The numeral 10 indicates a shaft, herein an armature shaft, having an inner race ring 12 clamped against a shoulder by a nut 14 threaded on one end of the shaft. An outer race ring 16 of a ball bearing 18 is mounted with a sliding or floating fit in a recess 20 of a casting 22 which forms the main section of the bearing housing. The other or closure section of the bearing housing is formed by a flanged cup 24 of pressed sheet metal the bottom of which overlies the end of the shaft and the flange 26 of which is secured to the section 22 by screws 28. The casting 22 has a portion 30 closely surrounding the shaft and provided with grease grooves so that the bearing is entirely housed against ingress of foreign matter and the lubricant is retained against escape.

The bearing housing has its outer periphery cylindrical to fit in a corresponding recess in the hub 32 of an end bell or plate 34 and the housing is retained rigidly at the bottom of the recess against an annular seat by screw bolts 36 passing through the hub of the end bell, through the flange 26 and into the section 22, between the screws 28. The end bell or plate 34 has an imperforate, dished end wall 38 and a series of arms 40 which are detachably secured in any suitable way, as by screw bolts, to the motor casing 42.

The pulley end 44 of the shaft, or the end which projects through its end plate, is mounted on a larger ball bearing 46 in a somewhat similar manner but the outer race ring 48 is securely held against axial movement in a housing section 50 by a closure section 52 which is perforated for the passage of the shaft. The end bell 54 is likewise perforated and provided with grease grooves and is also detachably connected to the motor casing 42. This bearing mounting is assembled and secured in a manner similar to the mounting at the first mentioned end of the shaft. Closure section 52 is spaced from the end bell and forms an additional grease groove therewith.

To secure access to the armature for any purpose, either end bell is removable by unfastening it from the casing and from the bearing housing and slipping it off endwise of the shaft and the bearings are kept completely housed and protected and their fit is not disturbed. To secure access to the bearings, as for renewing lubricant, the housing section 24 or 52 can then be removed by unscrewing the fastening screws 28. With one end bell removed, the entire shaft, bearings and housings can then be slipped out of the other end bell. When in use, one end of the shaft is held against endwise movement but the other end of the shaft and its bearing can float in the bearing housing if the shaft expands.

Although the invention has been disclosed by reference to a motor and its shaft and casing, it is to be understood that this is merely illustrative and that the invention is not necessarily limited to the specific embodiment selected for illustration.

I claim:

1. In a bearing mounting, a casing having a detachable end plate with a cylindrical recess therein, a shaft, an inner race ring fixed to the shaft, an outer race ring, antifriction elements between the race rings, a bearing housing comprising a main section closely surrounding the shaft at the inner side of the bearing and having its outer periphery arranged to fit said cylindrical recess, said section having a recess to receive the outer race ring with a sliding fit, a detachable closure section at the outer side of the bearing secured to the main section and extending across the end of the shaft, and a screw bolt extending through the end plate and into said bearing housing to secure the latter rigidly in the end plate; substantially as described.

2. In a bearing mounting, a casing having a detachable end plate with a cylindrical recess and an annular seat therein, a shaft, an inner race ring fixed to the shaft, an outer race ring, antifriction elements between the race rings, a bearing housing comprising a main section closely surrounding the shaft and having its outer periphery arranged to slip freely into or out of said cylindrical recess by axial movement, said main section having a recess to receive the outer race ring with a sliding fit, a detachable closure section comprising a flanged cup closing the outer side of the bearing and having its flange received in the cylindrical recess against the annular seat, said flanged cup having its flange secured to the main section, and a screw bolt extending through the end plate and the flange of the closure section and threaded in the main section; substantially as described.

3. In a bearing mounting, a casing having at each end a detachable end plate with a cylindrical recess and an annular seat therein, a bearing housing fitting in each recess against said annular seat, a shaft, antifriction bearings between said shaft and the bearing housings, one of said bearings having a sliding fit in its housing and the other bearing being fixed against axial movement, said shaft extending through the end plate from the fixed bearing and said fixed bearing being of larger size, and means for detachably securing said bearing housings in the recesses of said end plates against the annular seats therein; substantially as described.

In testimony whereof I hereunto affix my signature.

RAYMOND L. BROWN.